United States Patent
Kimura et al.

(10) Patent No.: US 8,416,655 B2
(45) Date of Patent: Apr. 9, 2013

(54) OPTICAL PICKUP

(75) Inventors: Katsuhiko Kimura, Kasumigaura (JP);
Jun Hato, Fujisawa (JP); Zhi Yan Gao,
Kawasaki (JP)

(73) Assignee: Hitachi Media Electronics Co., Ltd.,
Iwate (JP)

( * ) Notice: Subject to any disclaimer, the term of this patent is extended or adjusted under 35 U.S.C. 154(b) by 0 days.

(21) Appl. No.: 13/218,786

(22) Filed: Aug. 26, 2011

(65) Prior Publication Data

US 2012/0127845 A1    May 24, 2012

(30) Foreign Application Priority Data

Nov. 24, 2010 (JP) .................. 2010-261144

(51) Int. Cl.
*G11B 7/00* (2006.01)
(52) U.S. Cl. .................................................. 369/44.14
(58) Field of Classification Search ............... 369/44.12, 369/44.13, 44.14, 44.15, 44.16, 44.21
See application file for complete search history.

(56) References Cited

U.S. PATENT DOCUMENTS

| 7,002,878 | B2* | 2/2006 | Inui et al. ................ | 369/44.14 |
| 7,196,978 | B2* | 3/2007 | Iida et al. ................ | 369/44.15 |
| 7,397,732 | B2* | 7/2008 | Kimura et al. ........... | 369/44.14 |
| 7,986,594 | B2* | 7/2011 | Aoki et al. ............... | 369/44.15 |
| 8,023,367 | B2* | 9/2011 | Ochi et al. ................ | 369/44.15 |

FOREIGN PATENT DOCUMENTS

| JP | 2007-207290 | 8/2007 |
| JP | 2009-76196 | 4/2009 |
| JP | 2010-73225 | 4/2010 |

* cited by examiner

*Primary Examiner* — Nabil Hindi
(74) *Attorney, Agent, or Firm* — Antonelli, Terry, Stout & Kraus, LLP.

(57) ABSTRACT

An optical pickup includes an objective lens, a lens holder which holds the objective lens, a focusing coil attached to the lens holder having the winding axis directed at the optical axis of the objective lens, and a magnet provided opposite the side surface of the lens holder. A protruding portion is attached to the side surface of the lens holder at a side apart from the objective lens with respect to the optical axis direction of the objective lens farther than the focusing coil.

4 Claims, 4 Drawing Sheets

OPTICAL PICKUP

TECHNICAL FIELD

The present invention relates to an optical pickup installed in an optical disc drive for reading information recorded in a recording surface of an optical disc, or recording information in the optical disc.

BACKGROUND

A generally employed objective lens driving apparatus provided in an optical pickup of the optical disc drive includes a lens holder which accommodates the objective lens, a focusing coil and a tracking coil attached to the lens holder, a supporting member for supporting a moving part which includes those coils, a yoke and magnets.

When applying driving current to the focusing coil, the electromagnetic force generated through action with the magnetic flux from the magnet brings the moving part closer to the optical disc surface, or drives the moving part in a focusing direction away from the optical disc surface. Likewise, when applying the driving current to the tracking coil, the electromagnetic force generated through action with the magnetic flux from the magnet drives the moving part in the tracking direction as the radial direction of the optical disc.

Japanese Unexamined Patent Publication No. 2009-76196 (see pages 42, 44, FIGS. 63, 65, 70) discloses the generally employed objective lens driving apparatus that needs a stopper for restricting movement of the moving part to a predetermined amount. The aforementioned document discloses the structure in which the lens holder is provided with the mechanical stopper.

Referring to FIG. 65 of Japanese Unexamined Patent Publication No. 2009-76196, the mechanical stopper is provided closer to the objective lens than the focusing coil in the focusing direction. Referring to the description in page 44 and FIG. 70 of the aforementioned document, the winding axis of the focusing coil is directed perpendicular to the optical axis of the objective lens.

Generally, the interval between the mechanical stopper and the cover for restricting the movement in the focusing direction needs to be set to a predetermined value in order to cope with deviation of the optical disc. The predetermined interval needs to be set between the cover and the optical disc in order to prevent contact therebetween.

The height of the objective lens driving apparatus in the focusing direction is set by adding height of the focusing coil disposed at the side apart from the objective lens farther than the mechanical stopper to the distance between the mechanical stopper and the cover. This may increase the height of the generally employed objective lens driving apparatus.

SUMMARY

The present invention provides a thin type optical pickup by reducing the height of the objective lens driving apparatus while ensuring its predetermined movement in the focusing direction.

The present invention provides an optical pickup which includes a protruding portion attached to a lens holder that accommodates an objective lens, a cover for covering the lens holder, a focusing coil attached to the lens holder having a winding axis directed at an optical axis of the objective lens, and a magnet provided opposite a side surface of the lens holder. The protruding portion is attached to the side surface of the lens holder at a side opposite the magnet, and positioned below the focusing coil.

Preferably, the magnet is triparted, and a center magnet of the triparted magnets has its thickness reduced to be smaller than each thickness of the other magnets in a direction apart from the side surface of the lens holder. The protruding portion is provided at a position opposite the center magnet.

Preferably, a thickness of the center magnet is smaller than each thickness of the magnets at both sides.

Preferably, the center magnet of the triparted magnets is formed into an arc-like groove so that the center magnet becomes thinner than the other magnets in the direction apart from the side surface of the lens holder.

Preferably, the magnet is supported at a yoke, and a stepped portion is formed by the center magnet of the triparted magnets in a direction apart from the side surface of the lens holder by forming a concave portion in a part of the yoke at a position corresponding to the center magnet which is accommodated in the concave portion.

The present invention provides the thin type optical pickup by reducing the height of the objective lens driving apparatus while ensuring its predetermined movement in the focusing direction.

DESCRIPTION OF THE PREFERRED EXAMPLES

Figure 1:
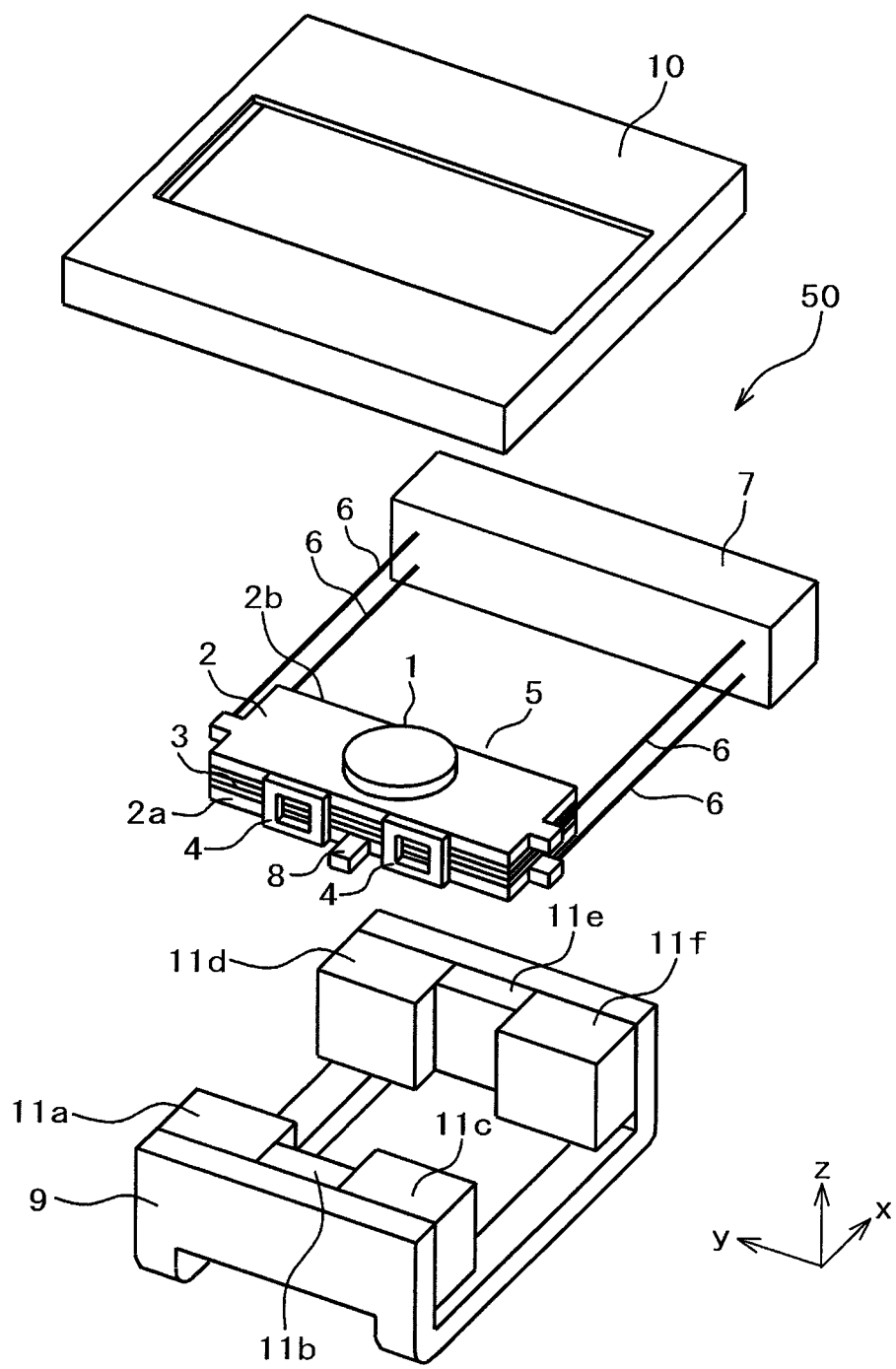
FIG. 1 is a perspective view of an objective lens driving apparatus according to an example of the present invention.

The present invention has been made in the course of examining thickness reduction of the optical pickup in conformity with the trend for thinning the laptop PC.

In case of the generally employed objective lens driving apparatus in which the lens holder is provided with the focusing coil while directing the winding axis at the optical axis of the objective lens, a protruding portion is attached to a top surface of a lens holder (lateral to the lens) so that the protruding portion serves as a stopper while being abutted against the cover. The aforementioned structure needs to attach the focusing coil and the tracking coil below the top surface of the lens holder as the reference surface, which has caused the problem of interfering with thinning of the optical pickup.

The following examples have been obtained as a result of thorough examinations of the inventors of the present invention who found possibility of thinning the optical pickup so long as the protruding portion is positioned at the level lower than the focusing coil.

Examples of the present invention will be described referring to the drawings.

An objective lens driving apparatus 50 of the optical pickup 110 according to the present invention will be described hereinafter.

Figure 2:
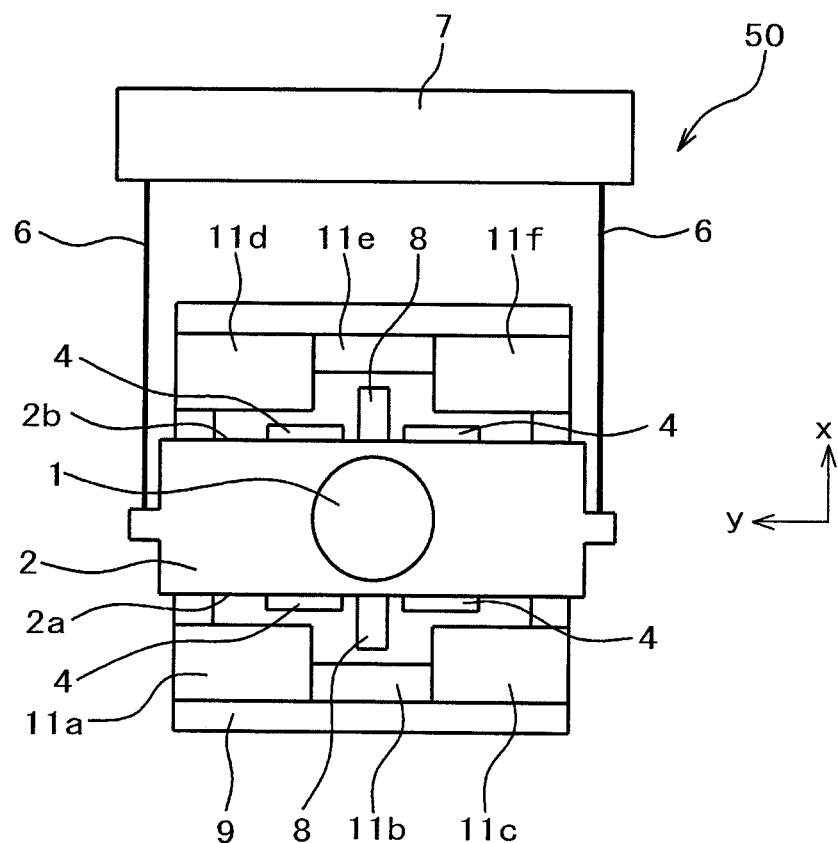
FIG. 2 is a top view of the objective lens driving apparatus as shown in FIG. 1.
Figure 3:
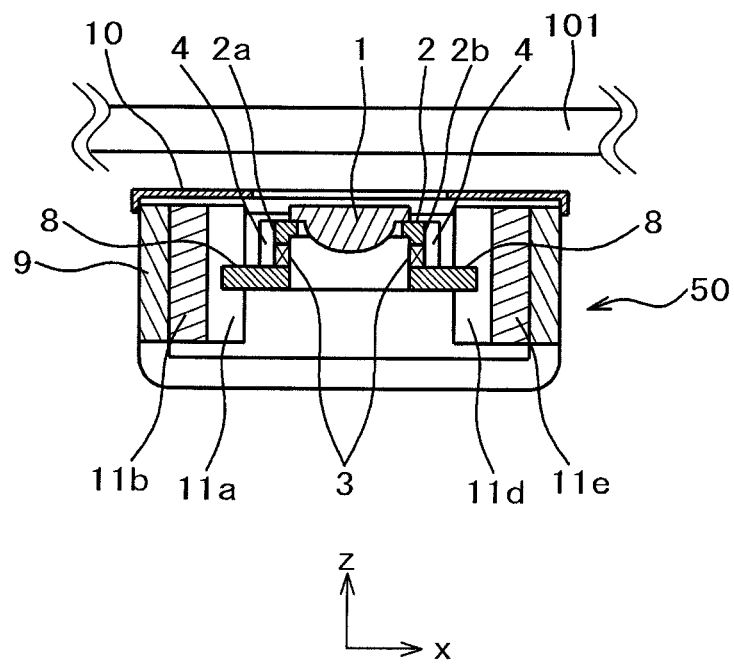
FIG. 3 is a sectional view of the objective lens driving apparatus as shown in FIG. 1.

FIG. 1 is a perspective view of the objective lens driving apparatus 50 of the optical pickup 110 according to the present invention. FIG. 2 is a top view showing a main part of the objective lens driving apparatus 50. FIG. 3 is a sectional view of the main part of the objective lens driving apparatus 50 with respect to a section in parallel with an xz plane which passes the center of an objective lens 1.

Referring to the drawing, a z-direction is defined as a focusing direction which brings the objective lens 1 closer to or away from a not shown optical disc along an optical axis of the objective lens 1, and a y-direction is defined as a tracking direction in which the objective lens 1 is moved in the radial direction of the optical disc. An x-direction is orthogonal to both the y-direction and the z-direction.

Referring to FIGS. 1 to 3, the objective lens 1 of the objective lens driving apparatus 50 is set on the upper surface of a lens holder 2. A focusing coil 3 is attached to the lens holder 2 while directing the winding axis at the optical axis of the objective lens 1. Tracking coils 4 are attached to two side surfaces 2a and 2b of the lens holder 2 in parallel with the focusing and the tracking directions.

Each of supporting members 6 has its end fixed to the lens holder 2, and the other end fixed to a fixing portion 7. A moving part 5 which includes the objective lens 1, the lens holder 2, the focusing coil 3, and the tracking coils 4 is supported by the supporting members 6 so as to be movable with respect to the fixing portion 7. The focusing coil 3 and the tracking coils 4 are electrically coupled with each one end of the supporting members 6 via a solder.

Three magnets 11a, 11b, 11c, and 11d, 11e, 11f are provided along the tracking direction at sides opposite the two side surfaces 2a and 2b of the lens holder 2 in parallel with the focusing and the tracking directions, respectively. They are attached to a yoke 9 as a magnetic body.

Among groups of the three magnets provided at the sides opposite the two side surfaces 2a and 2b of the lens holder 2, each of the center magnets 11b and 11e has the thickness in the x-direction smaller than that of the magnets 11a, 11c and 11d, 11f at both sides in the x-direction. Each installation surface of the magnets 11a to 11c, and 11d to 11f to the yoke 9 is in the same plane, and accordingly, the surface of the center magnet 11b opposite the side surface 2a of the lens holder 2 is apart from the side surface 2a of the lens holder 2 farther than each surface of the magnets 11a, 11c at both sides opposite the side surface 2a of the lens holder 2. The surface of the center magnet 11e opposite the side surface 2b of the lens holder 2 is apart from the side surface 2b of the lens holder 2 farther than each surface of the magnets 11d, 11f at both sides opposite the side surface 2b of the lens holder 2.

The two side surfaces 2a and 2b of the lens holder 2 are provided with protruding portions 8 each protruding in the direction orthogonal to the focusing direction and the tracking direction at the side apart from the objective lens 1 farther than the focusing coil 3 in the focusing direction.

The protruding portions 8 attached to the lens holder 2 are disposed at positions opposite the center magnets 11b and 11e, respectively. In other words, the protruding portions 8 attached to the lens holder 2 are positioned in the respective spaces defined by the center magnets 11b and 11e apart from the side surfaces 2a, 2b of the lens holder 2 farther than the magnets 11a, 11c and 11d, 11f at both sides.

In this example, the protruding portions 8 are provided below the focusing coil 3 so as to be close to the center magnets 11b and 11e among those of 11a to 11f. Among the triparted magnets 11a to 11f, each of the center magnets 11b and 11e has the thickness smaller than each thickness of the other magnets. This allows the protruding portions 8 to be movable in the respective spaces defined by the center magnets 11b and 11e.

When applying electric current to the focusing coil 3 of the objective lens driving apparatus 50, the driving force in the focusing direction is generated by electromagnetic action with the magnets 11a to 11f so that the moving part 5 moves in the focusing direction. When applying electric current to the tracking coils 4, the driving force in the tracking direction is generated by electromagnetic action with the magnets 11a to 11f so that the moving part 5 moves in the tracking direction.

Referring to FIG. 3, a cover 10 is placed above the moving part 5, the magnets 11a to 11f, and the yoke 9, and has both ends attached to the yoke 9. The cover 10 serves to restrict the upward movement of the moving part 5 in the focusing direction, that is, the direction approaching the optical disc 101. If the moving part 5 largely moves upward in the focusing direction, the protruding portions 8 attached to the lens holder 2 abut against the cover 10, and the movement in the focusing direction is restricted.

Figure 4:
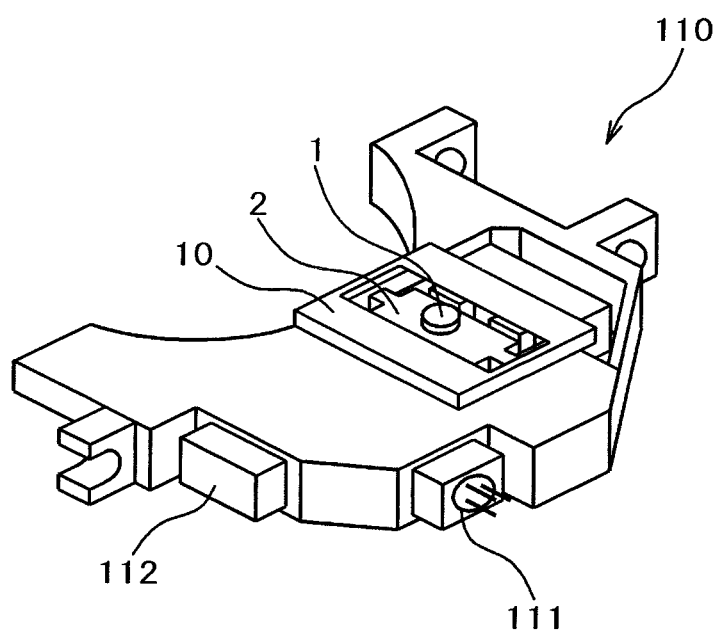
FIG. 4 is a perspective view of an optical pickup according to the present invention.

FIG. 4 illustrates the optical pickup 110 which includes the objective lens driving apparatus 50 as shown in FIGS. 1 to 3.

Referring to FIG. 4, the optical pickup 110 is provided with a laser emitting device 111, a photo detector 112 and the like. Laser light emitted from the laser emitting device 111 is focused on a not shown optical disc by the objective lens 1. The focused laser right reflects on the optical disc to pass the objective lens 1, and makes incidence to the photo detector 112. A servo signal is detected from the signal derived from the photo detector 112. Based on the servo signal, a driving signal is input to the focusing coil 3 and the tracking coils 4 of the objective lens driving apparatus 50 for conducting positioning control of the objective lens 1. A reproduction signal is detected from the signal derived from the photo detector 112 for reproducing the optical disc information.

Advantages of the thus structured present invention will be described.

Referring to FIG. 3 which shows positional relationship between the objective lens driving apparatus 50 and the optical disc 101 in the focusing direction, a predetermined interval is set between the cover 10 and the optical disc 101 for preventing the contact therebetween. Predetermined moving distance of the moving part 5 in the focusing direction needs to be set in accordance with the specification to cope with deviation of the optical disc 101. The moving distance in the upward focusing direction is set in accordance with the interval between the cover 10 and the protruding portion 8 attached to the lens holder 2. The moving distance in the downward focusing direction is set in accordance with the interval between the lower surface of the lens holder 2 and the yoke 9, or a casing of the optical pickup 110 as shown in FIG. 4.

Therefore, the height of the objective lens driving apparatus 50 is determined by the upward moving distance in the focusing direction, the dimension from the upper surface of the protruding portion 8 for restricting movement in the focusing direction to the lower surface of the lens holder, and the moving distance in the downward focusing direction.

In the present invention, the winding axis of the focusing coil 3 is directed at the optical axis of the objective lens 1 so as to reduce height of the focusing coil 3. This makes it possible to provide the focusing coil 3 at the side closer to the objective lens 1 than the protruding portion 8 attached to the lens holder.

Then the focusing coil 3 is not provided below the protruding portion 8. The distance between the protruding portion 8 and the lower surface of the lens holder 2 may be set to the dimension so that the protruding portion 8 is allowed to function as the stopper. This makes it possible to reduce the height of the objective lens driving apparatus 50 to form the thin type optical pickup 110.

Generally, moving distance in the focusing direction needs to be approximately +/− 1 mm. The focusing coil disclosed in Japanese Unexamined Patent Publication No. 2009-76196, which has the winding axis vertically directed with respect to the optical axis of the objective lens is required to set its height to approximately 2 mm. As the focusing coil is attached to the side surface of the lens holder, generally employed structure requires height of the lens holder to be approximately 2 mm or more.

Meanwhile, in the present invention, the winding axis of the focusing coil 3 is directed at the optical axis of the objective lens 1 so that the height of the focusing coil 3 is set to approximately 0.5 mm. The height of the protruding portion 8 may be set to approximately 0.5 mm so as to ensure its strength. If the distance between the upper surface of the lens holder 2 and the focusing coil 3 is set to approximately 0.5 mm as the frame for attachment of the focusing coil 3, the lens holder 2 according to the present invention has its height of approximately 1.5 mm, thus making the thickness smaller than the generally employed structure by approximately 0.5 mm.

Example 2

Figure 5:
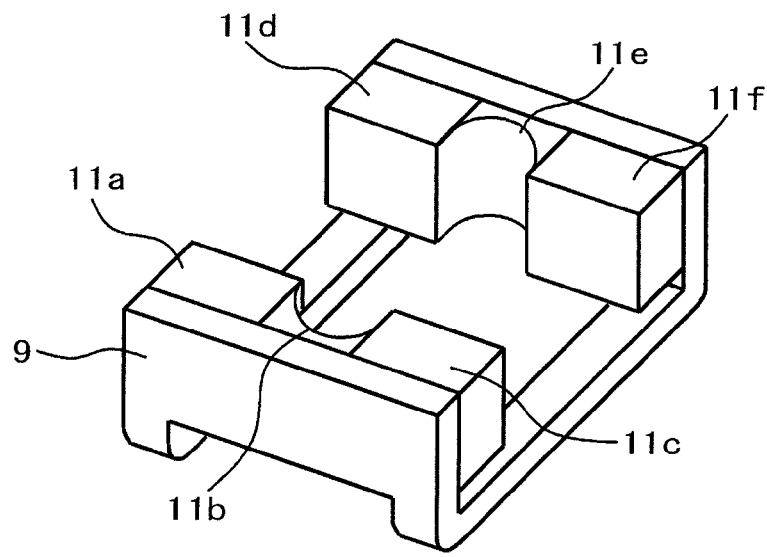
FIG. 5 is a perspective view of magnets and a yoke according to Example 2 of the present invention.

FIG. 5 is a perspective view illustrating the magnets and the yoke according to Example 2 of the present invention.

Referring to FIG. 5, groups of three magnets of 11a, 11b, 11c, and 11d, 11e, 11f are arranged along the tracking direction at the respective sides opposite the two side surfaces 2a, 2b of the lens holder 2 in parallel with the focusing and the tracking directions. They are attached to the yoke 9 as the magnetic body.

Among the groups of three magnets arranged opposite the two side surfaces 2a, 2b of the lens holder 2, each of the center magnets 11b and 11e is formed into a vertical arc-like groove so as to have the thickness in the x-direction smaller than each thickness of the magnets 11a, 11c and 11d, 11f in the x-direction.

The protruding portions 8 attached to the lens holder 2 are provided at positions opposite the center magnets 11b and 11e, respectively. That is, the protruding portions 8 attached to the lens holder 2 are provided in spaces each defined by the arc-like grooves of the center magnets 11b, 11e gradually apart from the side surfaces 2a, 2b of the lens holder 2.

In this example, the protruding portions 8 are attached below the focusing coil 3 so that the protruding portions 8 are brought into closer to the center magnets 11b, 11e, respectively among those of 11a to f. In this example, among the triparted magnets 11a to 11f, each of the center magnets 11b and 11e is formed to have a vertical groove-like structure having its thickness gradually reduced to be smaller than each thickness of the other magnets. This makes it possible to move the protruding portions 8 in the spaces defined by the center magnets 11b and 11e, respectively.

In this example, the triparted magnets are used, and the center magnet is formed into the arc groove-like structure. However, the magnet does not have to be triparted. The solid magnet is capable of providing sufficient effects.

Example 3

Figure 6:
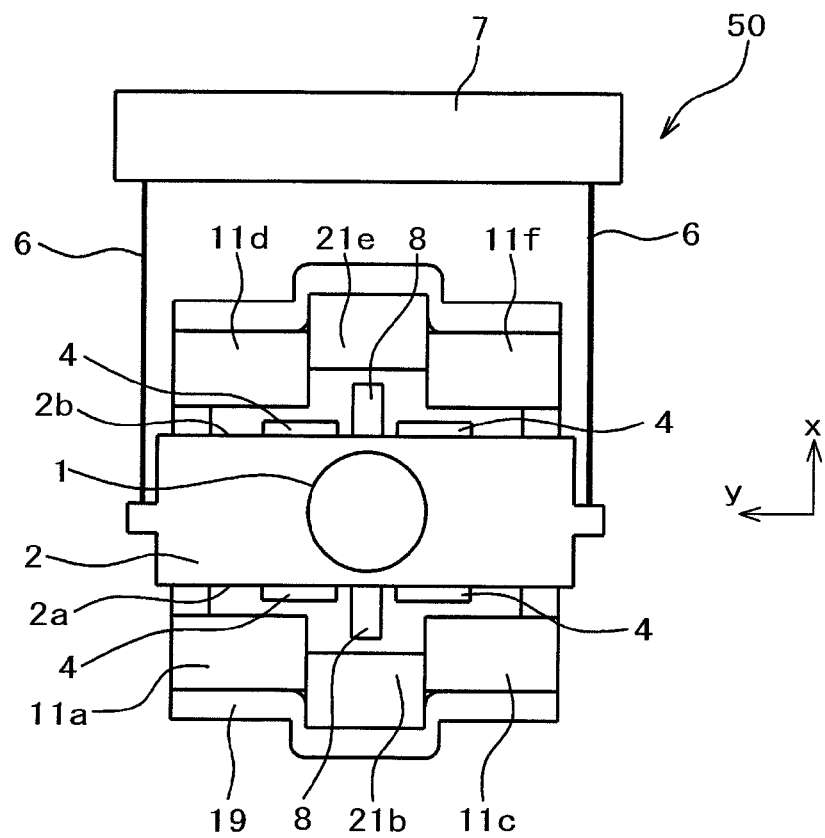
FIG. 6 is a top view of the objective lens driving apparatus according to Example 3 of the present invention.

FIG. 6 shows another example of the objective lens driving apparatus of the optical pickup according to the present invention.

FIG. 6 is a top view of the objective lens driving apparatus according to another example of the present invention. This example has the same structure as that of Example 1 except each thickness of center magnets 21b, 21e in the x-direction and configuration of a yoke 19. The elements of this example which are the same as those of Example 1 will be designated with the same codes.

Referring to FIG. 6, each thickness of the center magnets 21b, 21e in the x-direction is the same as that of the magnets 11a, 11c, and 11d, 11f at both sides in the x-direction. The installation surface of the center magnet 21b to the yoke 19 is apart from the side surface 2a of the lens holder 2 farther than each installation surface of the magnets 11a, 11c to the yoke 19 at both sides. The installation surface of the center magnet 21e to the yoke 19 is apart from the side surface 2b of the lens holder 2 farther than each installation surface of the magnets 11d, 11f to the yoke 19 at both sides.

So the surface of the center magnet 21b opposite the side surface 2a of the lens holder 2 is apart therefrom farther than each surface of the magnets 11a, 11c at both sides opposite the side surface 2a of the lens holder 2. The surface of the center magnet 21e opposite the side surface 2b of the lens holder 2 is apart therefrom farther than each surface of the magnets 11d, 11f at both sides opposite the side surface 2a of the lens holder 2.

The protruding portions 8 attached to the lens holder 2 are provided at positions opposite the center magnets 21b and 21e, respectively. In other words, the center magnets 21b, 21e are apart from the side surfaces 2a, 2b of the lens holder 2 farther than the magnets 11a, 11c, and 11d, 11f at both sides, and the resultant spaces accommodate the protruding portions 8, respectively.

The thus structured example provides the same effect for reducing the height of the objective lens driving apparatus as the one derived from Example 1. Furthermore, each thickness of the center magnets 21b, 21e in the x-direction is the same as that of the magnets 11a, 11c, 11d, 11f in the x-direction at both sides so that confirmation with respect to the magnet dimension is easily done. This allows easy handling for attachment of the magnets to the yoke 19.

According to the present invention, the winding axis of the focusing coil is directed at the optical axis of the objective lens, which allows the height of the focusing coil to be reduced. The protruding portion serving as the stopper is provided at the side below the focusing coil, that is, at the side farther apart from the objective lens. The coil does not have to be provided below the protruding portion, thus enabling the height of the objective lens driving apparatus to be reduced. This makes it possible to provide the thin type optical pickup.

What is claimed is:

1. An optical pickup comprising:
   a protruding portion attached to a lens holder that accommodates an objective lens;
   a cover for covering the lens holder;
   a focusing coil attached to the lens holder having a winding axis directed at an optical axis of the objective lens; and
   a magnet provided opposite a side surface of the lens holder, wherein:
   the protruding portion is attached to the side surface of the lens holder at a side opposite the magnet;
   the protruding portion is positioned below the focusing coil;
   the magnet is triparted;
   a center magnet of the triparted magnets has its thickness reduced to be smaller than each thickness of the other magnets in a direction apart from the side surface of the lens holder; and the protruding portion is provided at a position opposite the center magnet.

2. The optical pickup according to claim 1, wherein a thickness of the center magnet is smaller than each thickness of the magnets at both sides.

3. The optical pickup according to claim 1, wherein the center magnet of the triparted magnets is formed into an arc-like groove so that the center magnet becomes thinner than the other magnets in the direction apart from the side surface of the lens holder.

4. The optical pickup according to claim 1, wherein:
the magnet is supported at a yoke; and
a stepped portion is formed by the center magnet of the triparted magnets in a direction apart from the side surface of the lens holder by forming a concave portion in a part of the yoke at a position corresponding to the center magnet which is accommodated in the concave portion.

* * * * *